US005178257A

United States Patent [19]

Cross

[11] Patent Number: 5,178,257

[45] Date of Patent: Jan. 12, 1993

[54] WIRE CARRIER AND METHOD OF USING SAME

[75] Inventor: Dan A. Cross, Seattle, Wash.

[73] Assignee: The Boeing Company, Seattle, Wash.

[21] Appl. No.: 852,795

[22] Filed: Mar. 17, 1992

Related U.S. Application Data

[62] Division of Ser. No. 590,651, Sep. 28, 1990, Pat. No. 5,152,395.

[51] Int. Cl.[5] .................... B65G 29/00

[52] U.S. Cl. .................... 198/465.1; 198/687.1; 198/803.01; 206/389

[58] Field of Search .................... 198/687.1, 345.1, 345.3, 198/465.1, 465.2, 465.3, 803.01, 803.02, 803.14; 220/506, 507, 532, 533; 206/328, 331, 389

[56] References Cited

U.S. PATENT DOCUMENTS

| | | | |
|---|---|---|---|
| 4,176,751 | 12/1979 | Gillissie | 220/532 X |
| 4,602,715 | 7/1986 | Sarver et al. | 220/533 X |
| 4,651,863 | 3/1987 | Reuter et al. | 198/465.1 X |
| 4,722,453 | 2/1988 | Hamilton | 220/533 |
| 4,844,237 | 7/1989 | Petersen | 198/465.1 X |
| 4,901,876 | 2/1990 | Box | 220/533 |
| 5,011,041 | 4/1991 | Kakizaki | 220/507 |

*Primary Examiner*—D. Glenn Dayoan
*Attorney, Agent, or Firm*—Joan H. Pauly

[57] ABSTRACT

An open topped carrier (2) has a space (6) dimensioned to receive a plurality of coiled wire segments (100) hung on hangers (26) carried by upper portions of dividers (22). The dividers (22) are held in vertical, horizontally spaced use positions by slots (12) formed on the inner wall surfaces of the carrier (2). Each divider (22) may be independently grasped and slid into an elevated use position to facilitate hanging the coiled segment (100) on the hanger (26). A clamping device (32) extends along each of opposite side portions of an upper flange (14) of the carrier (2). The ends (102) of each segment (100) are clamped in an accessible transport position by the clamping device (32). The carrier (2) may have portions to facilitate handling of the segment ends (102) by an operator and/or an indicator bar (58) with a plurality of lights (62) aligned with the segment ends (102) for a human operator. The coiled configuration permits a segment end (102) to be released from the clamp (32) and pulled away from the carrier (2) for processing without moving the segment (100) or the divider (22) on which it is hung away from their lower transport positions.

5 Claims, 5 Drawing Sheets

WIRE CARRIER AND METHOD OF USING SAME

GOVERNMENT RIGHTS

The government has rights in this invention.

This application is a division of application Ser. No. 07/590,651, filed Sep. 28, 1990 now U.S. Pat. No. 5,152,395.

DESCRIPTION

1. Technical Field

This invention relates to systems for transporting and processing wire segments and, more particularly, to such a system in which a plurality of segments are individually hung in loose coils on hangers on dividers in an open top carrier that has two opposite rows of clamps on a top flange to position the ends of the wire segments.

2. Background Information

The wiring for the electrical systems of aircraft is conventionally assembled outside the aircraft into wire harnesses that include large numbers of wire segments having opposite ends leading to various connectors. The number of wire segments in a single harness can be as large as several hundred. The manufacture of a wire harness is a complicated procedure which is difficult to automate and, thus, is generally highly labor intensive. One of the major problems that has been encountered in conventional harness manufacture systems is the orderly transportation of wire segments to work stations in a manner which enables a human or robotic operator to efficiently locate and identify a particular segment end and perform the operation required for that segment end. A procedure which has commonly been used in the past is to transport multiple coiled wire segments randomly stacked in a simple rectangular box along with printed instructions for the processing of the segments. This procedure is very inefficient and requires a human operator to rummage through the box to locate a particular segment.

The patent literature includes a number of examples of systems for producing wire harnesses that include automated elements. U.S Pat. No. 4,043,017, granted Aug. 23, 1977, to K. F. Folk et al , discloses apparatus for inserting wires into terminals. The apparatus includes a shuttle-type wire feed with a clamp assembly slidably mounted on a guide bar. The assembly has a fixed clamping arm with spaced apart notches for wires, and a movable arm pivoted to clamp wires in the notches. U.S. Pat. No. 4,701,007 granted Oct. 2, 1987, to H. V. J. Jonca, discloses a system for assembling cables or wires into an electrical wiring part, such as an aircraft wire harness. In the Jonca system, a central computer supplies information to a plurality of work stations and lights up the path of a cable on a matrix of light indicators. This guides the operator in inserting cable ends into a connector. The system may include a cable storing magazine for cables that have not been located. In the system, a connector plug is mounted on a sliding unit which slides between parallel racks. Each rack has a row of notches into which cables can be engaged.

Devices for transporting and dispensing wire for use by electricians are disclosed in U.S. Pat. Nos. 3,485,458, granted Dec. 23, 1969, to M. J. Evans; No. 3,765,619, granted Oct. 16, 1973, to Robert H. Stillman; and No. 3,831,877, granted Aug. 27, 1974, to J. J. Bennett et al. Evans and Stillman disclose carriers for a plurality of a standard type of wire box in which wire is removed from the center of a coil through a top opening. Evans discloses an enclosed cart in which a plurality of wire boxes are carried side by side. The top plate of the cart has a plurality of stiff flexible tubular devices mounted thereon through which the ends of the wires are pulled. Stillman discloses a carrier cart which restrains the wire boxes as wire is pulled therefrom. Bennett et al. disclose a portable wire cart similar to a dolly on which a plurality of wire containing reels are mounted. One side of the cart has guide eyelets through which the wire is pulled.

Devices for dispensing strands of material from spools or reels which have means for clamping the outer end portion of the material are disclosed in U.S. Pats. No. 1,567,119, granted Dec. 29, 1925, to S. A. Dobyne and No. 2,181,766, granted Nov. 28, 1939, to C. P. Neats et al., and French Patent Application Publication No. 2,558,814, made available to the public on Aug. 2, 1985. Devices for dispensing strands or webs of material which have guides for the end portion being dispensed are disclosed in U.S. Pat. Nos. 2,848,104, granted Aug. 19, 1958, to A. Schor et al. and No. 3,746,276, granted Jul. 17, 1973, to D. V. Stotler and French Patent Application Publication No. 2,401,850, made available to the public on Mar. 30, 1979. U.S. Pat. No. 2,015,283, granted Sep. 24, 1935, to W. H. Pashley et al., discloses a partitioned container for storing and transporting flammable items, such as film contained in metal drums or cases. Swiss Patent No. 290,389, published Aug. 1, 1953, shows a hinged container for a plurality of articles, such as coiled material on hubs. No end positioner for the material is shown. U.S. Pat. No. 1,888,288, granted Nov. 22, 1932, to C. A. Purdy et al., discloses a method of manufacturing a sealed spool of electrical coils in which the completed coil has extending lugs to which electrical leads may be secured.

DISCLOSURE OF THE INVENTION

The present invention relates to a subsystem that was developed as part of a system for manufacturing aircraft wire harnesses. The overall system is the subject of the applicant's copending application entitled "Wire Harness Manufacturing System". The system includes a plurality of subsystems, such as a subsystem for automated processing of the ends of wire segments, which is the subject of another copending application of the applicant entitled "Automated Termination Station and Method of Using Same". In the early stages of the development of the system in general, and the present invention in particular, the applicant perceived that the manufacture of wire harnesses could be accomplished more efficiently by providing for processing and delivery of wire segments in batches. The applicant also perceived that indexing the precise location of the ends of the segments and ensuring their easy accessibility would greatly facilitate efficient batch delivery and processing.

The present invention provides a carrier for transporting a plurality of wire segments, each of which has opposite ends, and for positioning each end of each segment to be located and grasped by an operator. Operators for whom the carrier of the invention has been designed include human operators and/or robotic mechanisms. According to an aspect of the invention, the carrier includes a body defining a wire segment receiving space and having an upper opening communicating with the space. A plurality of laterally extending, substantially vertical dividers are positioned in the segment receiving space. Each divider has a hanger secured to an upper portion thereof. The dividers are spaced horizontally from each other to allow a coiled wire segment to be hung on each hanger and to extend downwardly and laterally outwardly therefrom. First and second clamp devices are carried by the carrier body adjacent to opposite lateral edges of the upper opening. Each of the clamp devices includes a plurality of releasable clamps positioned to receive one end of each wire segment hanging on the hangers, to position the end for location and grasping by an operator.

A feature of the invention which is preferred when some or all of the processing of the wire segments is to be accomplished by robots is robot engaging portions carried by the body. These portions are indexed relative to the clamping devices to enable a robot to accurately locate each end of each wire segment. In the currently preferred embodiment of this feature, the robot engaging portions comprise a locator member secured to the carrier body and having a hole formed therein for receiving a portion of a robot.

Each divider in the carrier is preferably independently slidable between a use position in which the hanger is at least substantially below the upper opening, and a loading position in which the hanger is above the opening to facilitate positioning a coiled wire segment thereon. This feature greatly facilitates manual loading of the carrier with wire segments and also makes the carrier readily adaptable to automated loading. The preferred manner of providing the independent slidability of the dividers is to provide the carrier body with substantially vertical sidewalls that have a plurality of substantially vertical slots formed thereon. The slots are arranged to receive opposite edge portions of the dividers. The slots maintain the dividers horizontally spaced from each other and also guide movement of each divider between its use position and its loading position The carrier of the invention may also b ®provided with additional features. One such feature is a computer memory module carried by the body to identify wire segments mounted on the hangers. In a system which uses carriers having this feature, the memory module may be loaded, at the work station where the wire segments are loaded into the carrier, with information regarding the exact location and identity of, and the required processing for, each wire segment. Thereafter, each wire segment may readily be identified and located, and the required processing may be defined, at other work stations simply by locally reading the information from the memory module.

Another feature that may be provided is an indicator bar removably mountable on the carrier body adjacent to one of the clamp devices. The indicator bar has a plurality of separately illuminable lights corresponding to and alignable with the clamps of the device. This feature greatly facilitates the quick location of a particular segment in a box by an operator, especially a human operator. It may also be used to designate one of the two ends of a segment.

The apparatus of the invention has another aspect which is a clamp for a plurality of wires. According to this aspect of the invention the clamp comprises an elongated clamp strip. The strip has a plurality of longitudinally spaced lateral slits for receiving and clamping wires. A hole extends laterally through the strip between each pair of adjacent slits. The strip has sufficient resiliency and compressibility, and the holes are sized, to allow deformation of the holes to localize the effect of insertion of a wire into one of the slits and prevent such insertion from affecting clamping of wires in adjacent slits. This aspect of the invention provides an effective clamp with a simple structure that can accommodate a wide range of wire diameters.

The invention also provides a method of transporting a plurality of wire segments and of delivering the ends of the segments to devices for processing the ends. The method comprises providing a carrier having a top opening. The carrier includes a plurality of substantially vertical, horizontally spaced dividers, and two rows of clamps adjacent to opposite lateral edges of the top opening. Each divider has a hanger on a top portion thereof In carrying out the method, each of a plurality of wire segments is hung in a loosely coiled configuration on a different one of the hangers The segment extends downwardly and laterally outwardly from the hanger in the carrier. Each end of each segment is secured in a clamp in a different one of the rows of clamps. The carrier with the segments hanging therein and the ends so clamped is transported to a work station where at least one device for processing the ends is located. One end of one of the segments is released from the clamp, and while the coiled segment continues to hang on the hanger, the released end is pulled into engagement with the processing device Then, while the segment continues to hang on the hanger, the end is moved back to the clamp and is again secured in the clamp.

Preferably, the loading of the carrier includes sliding the divider upwardly into its loading position before hanging the segment on the divider, and then lowering the divider back into its transport or use position. When one or more of the steps of releasing, pulling, moving, and again securing the segment end is to be performed by a robot, the carrier is preferably provided with robot engaging portions indexed relative to the clamps, as described above. Another feature, which is preferred whether the operator is a robot or a human, takes advantage of the loosely coiled configuration of the loaded segment to facilitate pulling the segment end to a processing device and moving it back to the clamp. The pulling of the end stores spring energy in the wire segment by reducing the diameter of a coil of the segment. The moving of the end back to the clamp is facilitated by allowing the spring energy to pull the end.

As noted above, the subsystem of the invention helps maximize the efficiency of batch transport and processing of wire segments during the manufacture of a wire harness. This in turn facilitates automated processing of the wire segments and increases the overall efficiency of the manufacturing system. In addition, the invention facilitates manual processing of the wire segments by eliminating any need for a human operator to rummage through a batch of segments in order to find a particular segment. The segments are presented to an operator, human or robotic, in an orderly and easily accessible manner. Thus, the invention has a high degree of versatility and may be used in systems that are entirely manual, are entirely automated, or have a mix of manual and automated operations. The carrier of the invention is also relatively simple in structure and economical to manufacture, use, and maintain.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

The drawings show a carrier 2 that is constructed according to the invention and that constitutes the best mode of the apparatus of the invention currently known to the applicant. The drawings also illustrate the best mode for carrying out the method of the invention currently known to the applicant.

Figure 1:
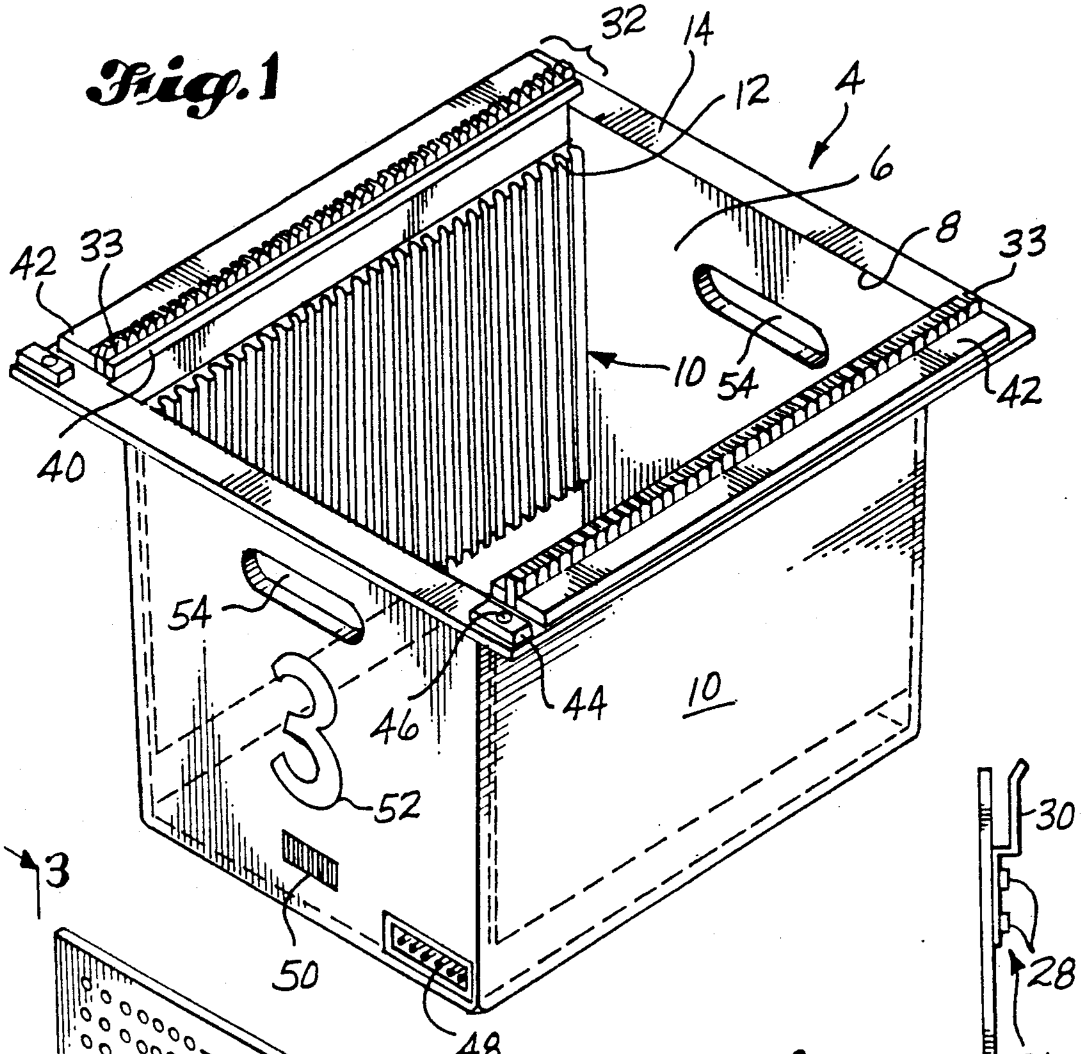
FIG. 1 is a pictorial view of the preferred embodiment of the carrier, excluding the dividers.
Figure 4:
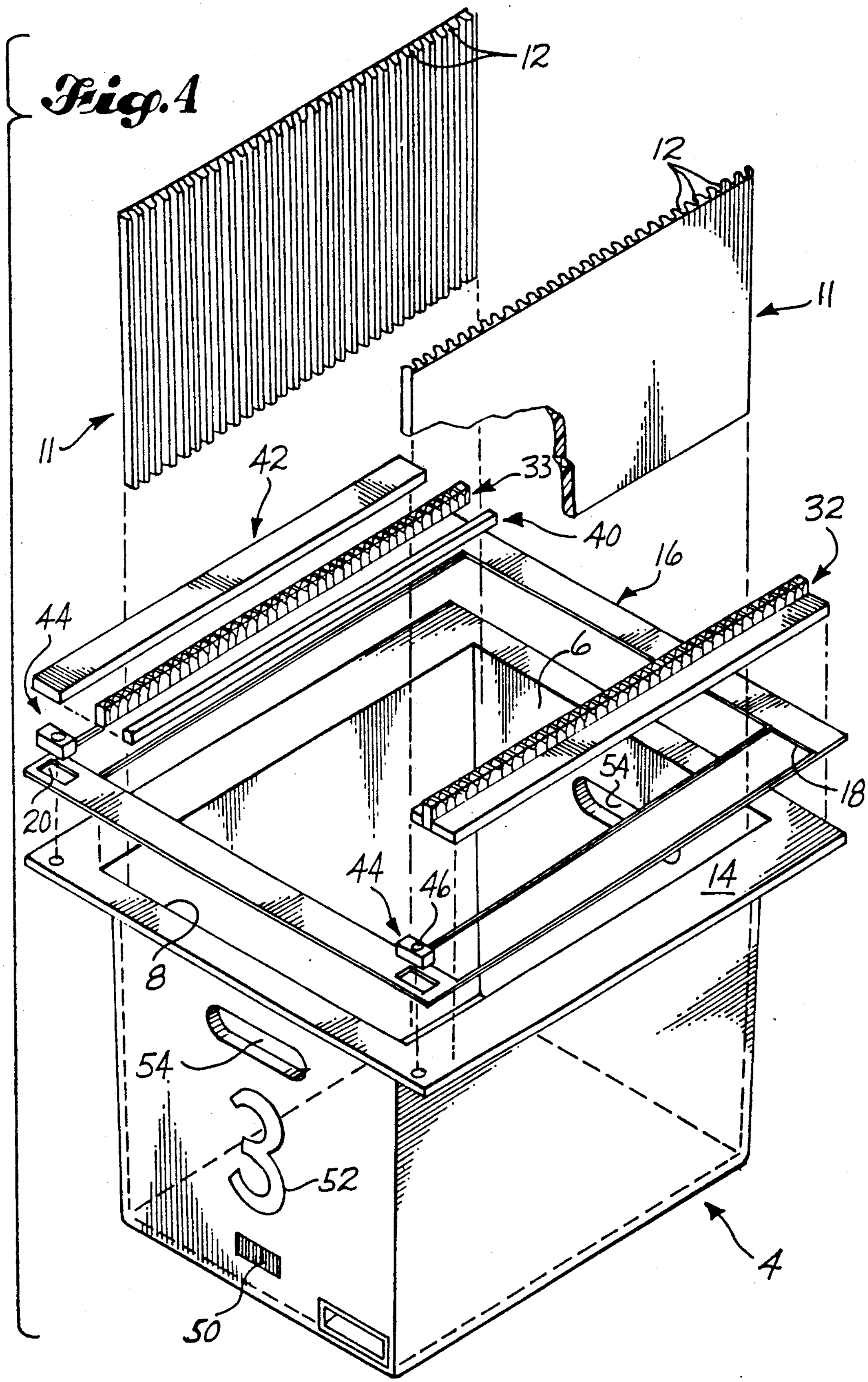
FIG. 4 is an exploded pictorial view of the preferred embodiment of the carrier shown in FIG. 1 and the indexing template.
Figure 7:
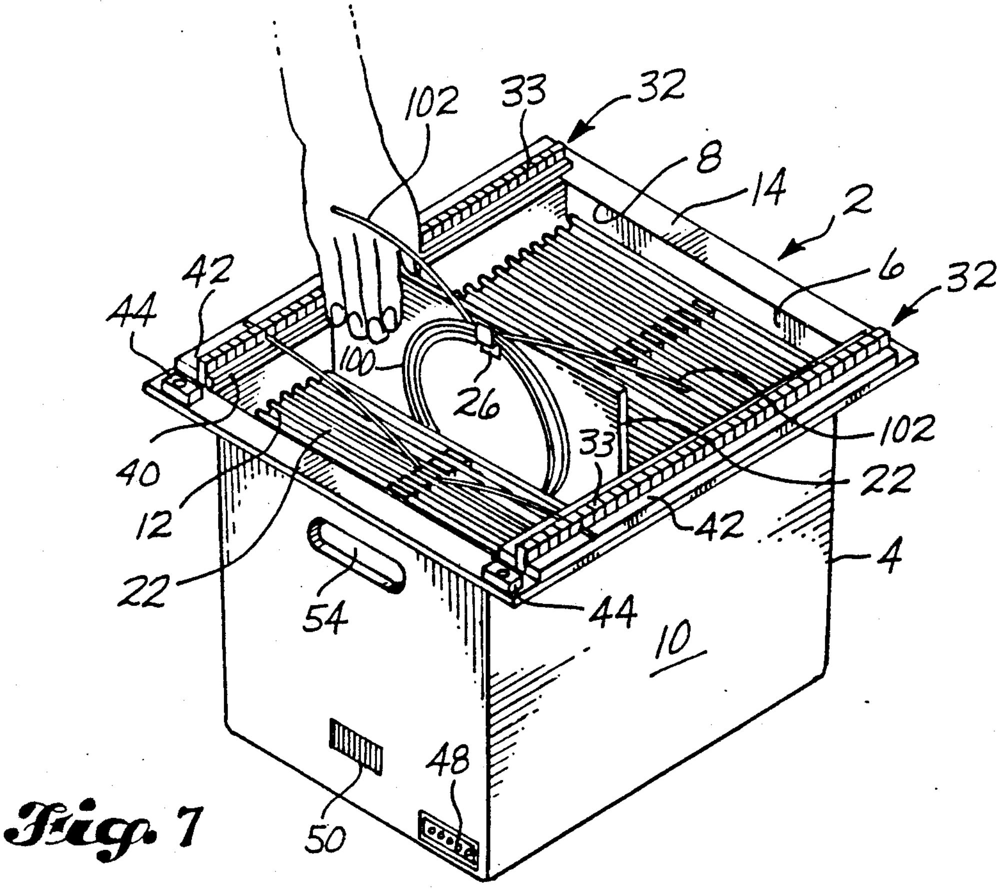
FIG. 7 is a pictorial view of the preferred embodiment of the carrier, illustrating the manual loading of the carrier.
Figure 8A:
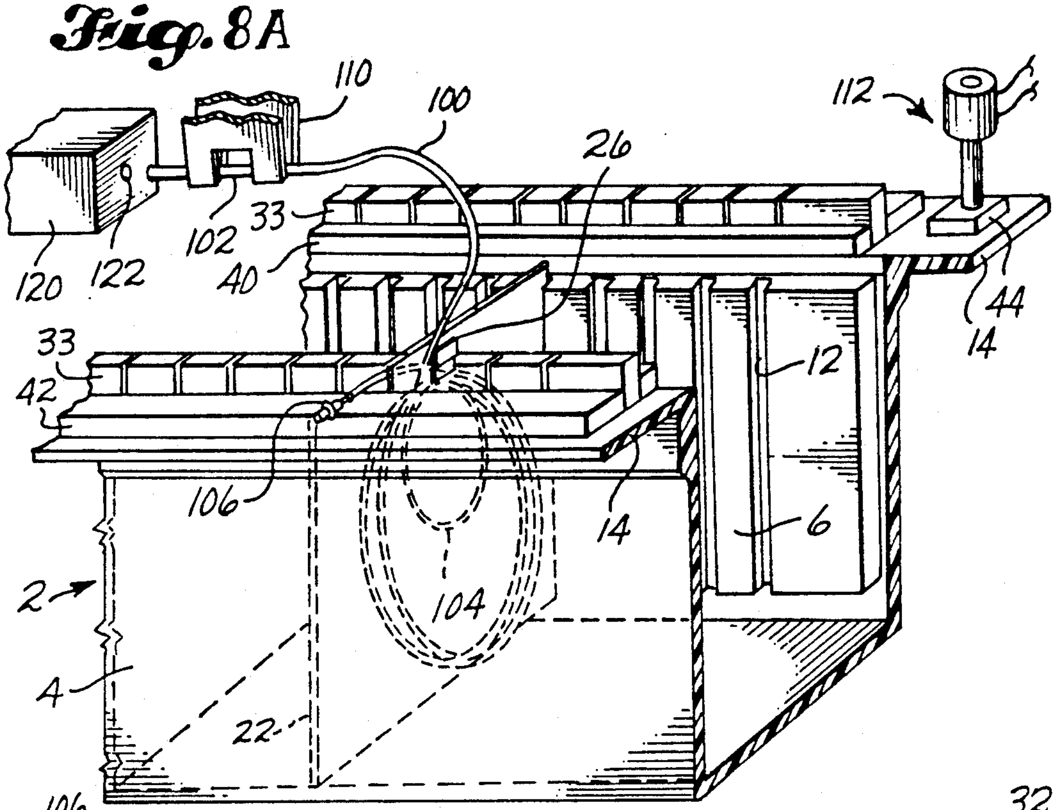
FIGS. 8A and 8B are pictorial and sectional views, respectively, illustrating the robotic handling of one of the wire ends of a segment loaded in the carrier.
Figure 8B:
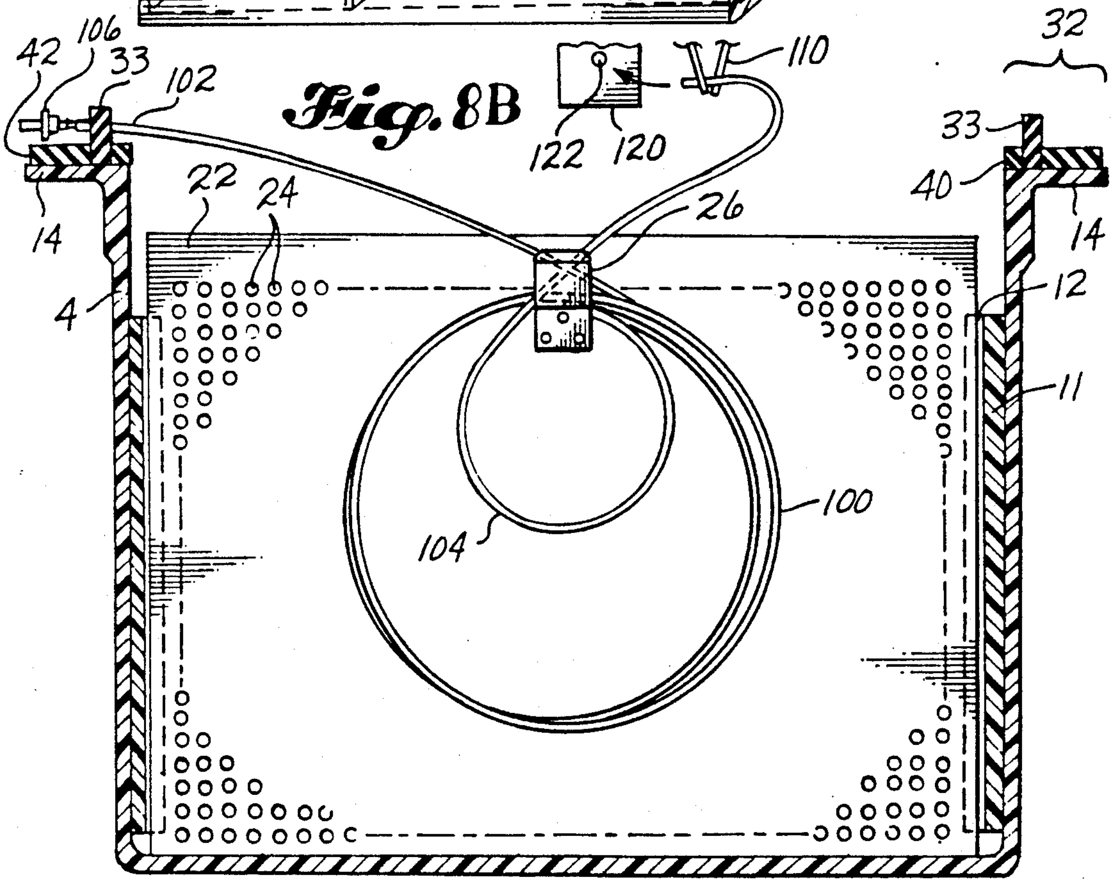
Figure 9:
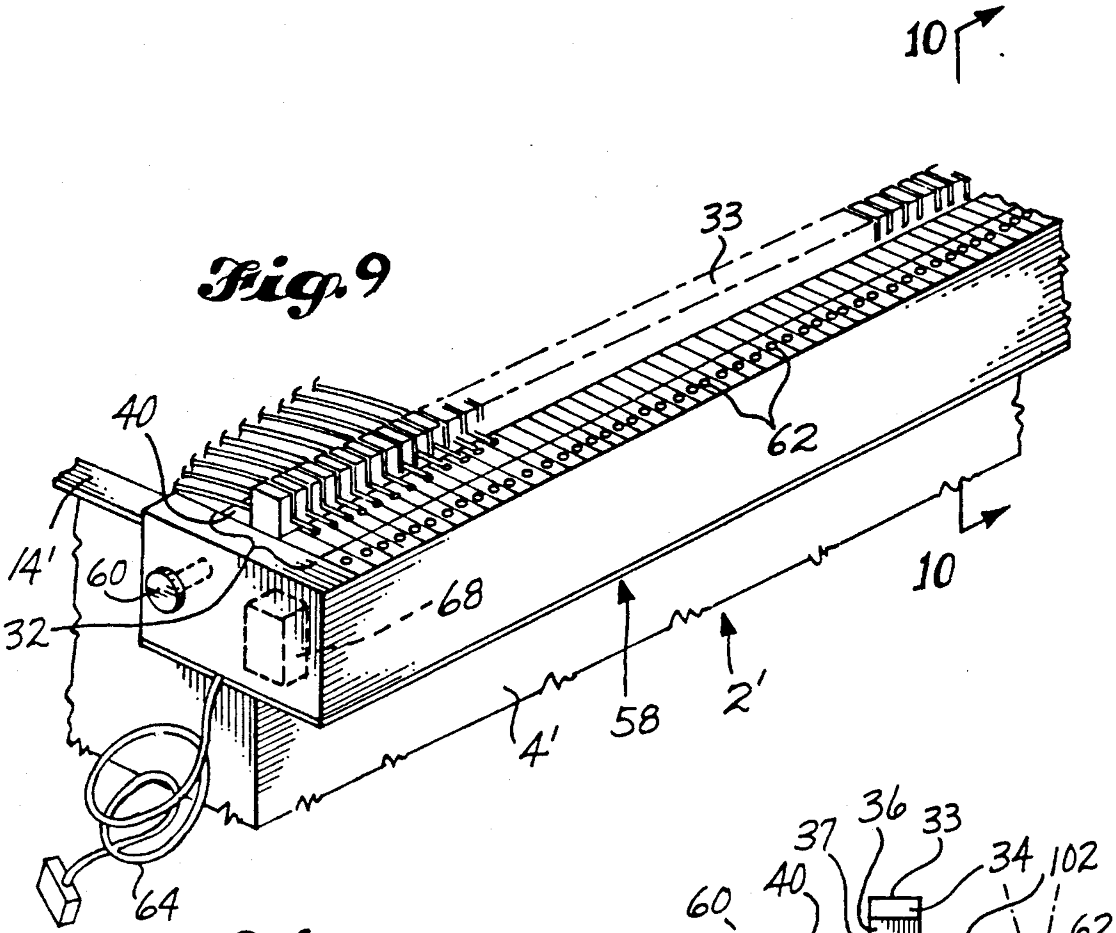
FIG. 9 is a pictorial view of a side edge portion of the carrier with a light indicator bar mounted thereon.
Figure 10:
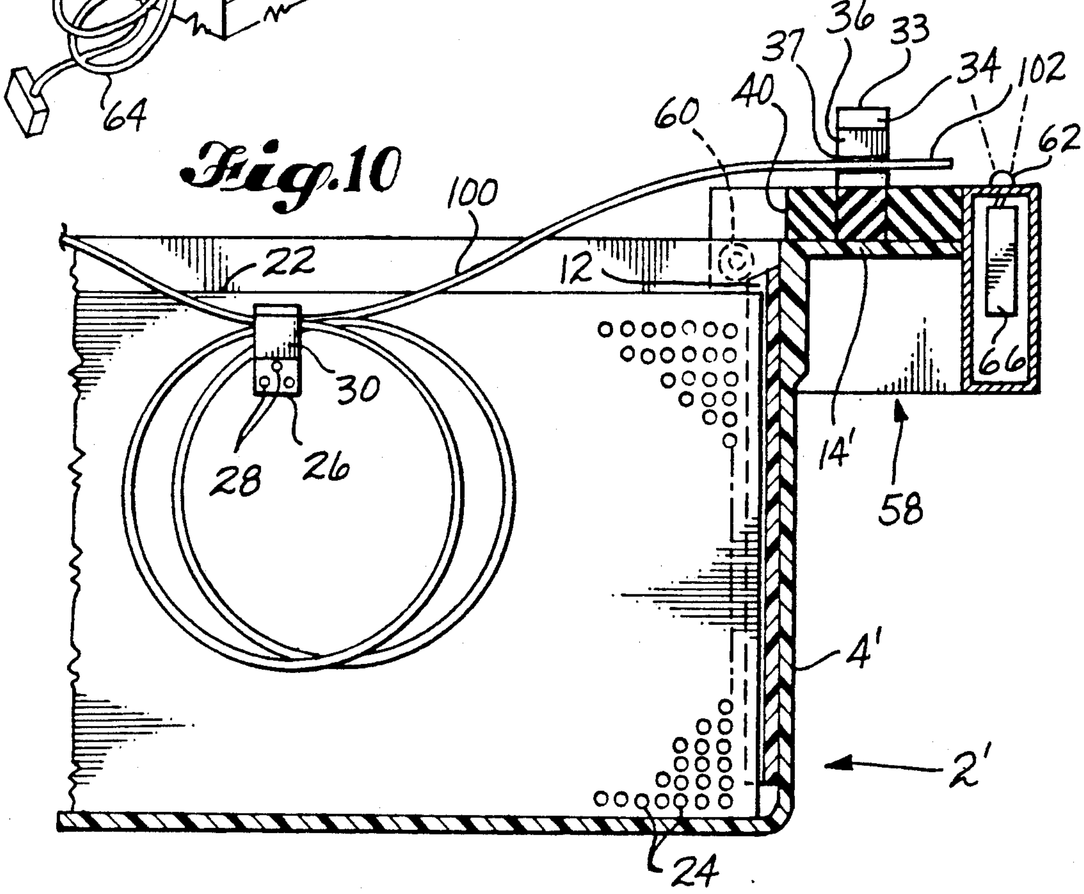
FIG. 10 is a sectional view illustrating the use of the indicator bar.

In FIGS. 1, 4, and 7, the carrier 2 is shown equipped with two locator members 44 to facilitate robotic handling of wire segments 100 loaded in the carrier 2. FIGS. 8A and 8B illustrate handling of a segment end 102 by a robot 110. It is anticipated that the primary application of the method and apparatus of the invention will be in systems using a robot of the type illustrated in FIGS. 8A and 8B and having the characteristics of the system disclosed in the applicant's copending applications, cited above. However, it is of course to be understood that the invention may also be used to advantage in other types of systems without departing from the spirit and scope of the invention. FIGS. 9 and 10 illustrate one type of feature which may be used with the carrier of the invention to facilitate manual handling of a wire segment 100 in either an entirely manual system or a system which, like the system disclosed in the copending applications, is partially automated. This feature is an indicator bar 58 to facilitate location of a particular segment by a human operator.

Referring to the drawings, and particularly to FIGS. 1, 4, and 7, the preferred embodiment of the carrier 2 includes a substantially rectangular hollow body 4 which defines a wire segment receiving space 6. The top of the body 4 is open, and the upper opening 8 defined by the tops of the substantially vertical sidewalls and endwalls of the body 4 is in open communication with and provides ready access to the segment receiving space 6. The opposite sidewalls 10 of the body 4 have a plurality of substantially vertical slots 12 formed thereon. These slots 12 are arranged in opposite pairs to receive opposite edge portions of dividers 22. The slots 12 maintain the dividers 22 horizontally spaced from each other and guide movement of each divider 22 between its use position inside the carrier body 4 and a raised loading position, as illustrated in FIG. 7.

Figure 5A:
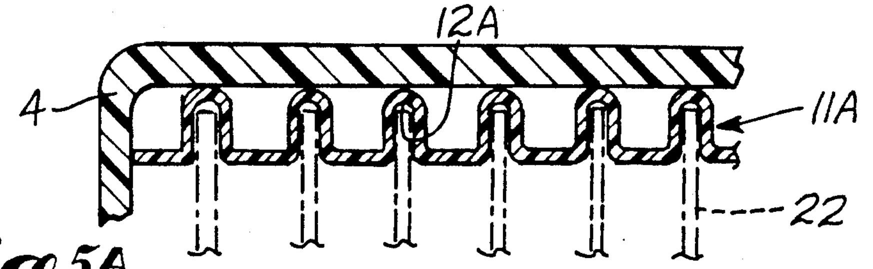
FIGS. 5A and 5B are fragmentary cross-sectional views showing two alternative embodiments of the portion of the carrier sidewall that forms the divider guide slots.
Figure 5B:
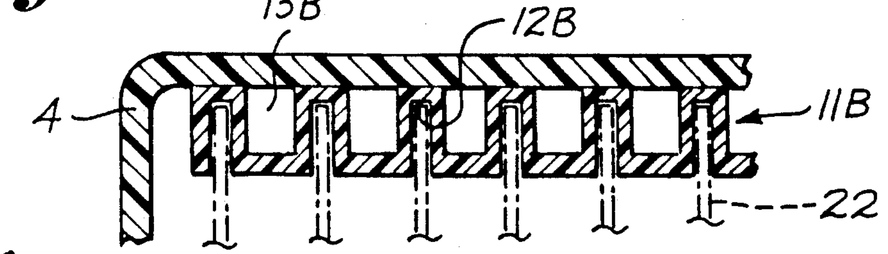

The slotted sidewalls 10 of the carrier body 4 may be formed integrally, with the slots 12 molded directly into the sidewall 10. Alternatively, as shown in FIG. 4, the outer portion of the sidewall 10 may be formed integrally with the main carrier body 4, and the slots 12 may be formed on a separate insert 11 which is subsequently secured to the inner surface of the outer portion of the sidewall 10. The inserts 11 may be secured by any suitable means, including adhesive and/or fasteners. For example, an adhesive bond might be reinforced by a bottom retainer strip secured to the carrier body 4 by pop rivets. FIGS. 5A and 5B illustrate two alternative configurations of the sidewall inserts 11A and 11B. The insert 11A shown in FIG. 5A has radiused slots 12A and is formed directly in the configuration shown by molding plastic. The insert 11B shown in FIG. 5B has rectangular slots 12B and is formed by machining a rectangular sheet of plastic. Cavities 13B are machined on the back side of the insert 11B to reduce its weight.

The relative desirability of molding the slots directly into the sidewall or forming the slots in a separate insert depends in part on the number of carriers to be manufactured. For a relatively small quantity of carriers, the separate forming of the inserts is generally less expensive. Machining the insert, as opposed to molding it, may be cost effective for manufacturing a very small quantity of carriers. However they are formed, the inserts may be either permanently secured to the main carrier body 4 or removably secured thereto to permit replacement of the inserts and/or reconfiguration of the inserts to increase or decrease the capacity of the carrier 2.

The top of the carrier body 4 has an upper flange 14 formed thereon extending horizontally outwardly from the upper opening 8. The body 4, including the flange 14, is preferably integrally molded. Various types of material, such as fiberglass, may be used, with the primary considerations being strength, durability, and lightness of weight. The end walls of the body 4 preferably have carrying slots 54 formed therein to enable the carrier 2 to be picked up and moved manually. As shown in FIGS. 1, 4, and 7, the outer surface of one end wall also preferably has a bar code 50 placed thereon. This bar code 50 may be supplemented with an identification number 52, as shown in FIGS. 1 and 4, for quick and easy reading by a human operator.

Figure 2:
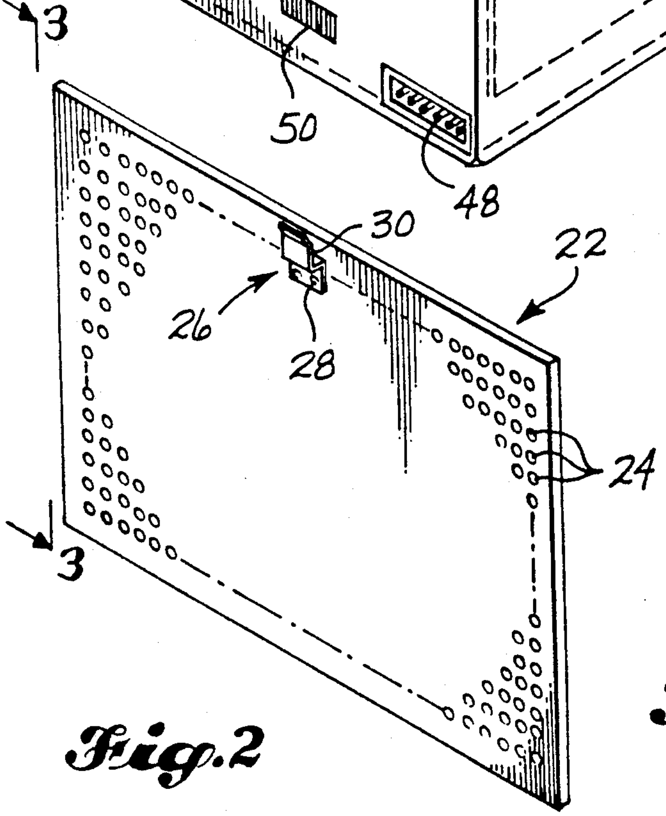
FIG. 2 is a pictorial view of the preferred embodiment of the divider.
Figure 3A:
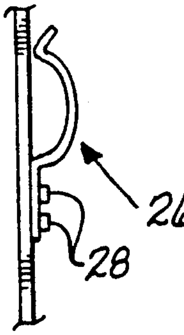
FIG. 3A is a side elevational view of a modified form of the hanger.
Figure 3:
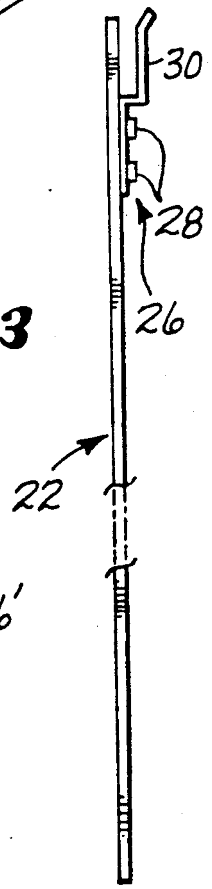
FIG. 3 is a side elevational view of the divider shown in FIG. 2.

The preferred embodiment of the divider 22 is shown in FIGS. 2 and 3. The divider 22 is typically made from a sheet of metal or other material having a multiplicity of perforations 24 formed therein. These perforations 24 reduce the weight of the divider 22 to thereby reduce the weight of a fully loaded carrier 2 and maintain such weight within limitations for manual handling It is presently contemplated that the typical carrier 2 of the preferred embodiment will have fifty pairs of slots 12 to accommodate fifty dividers 22 and fifty wire segments 100 carried thereby. Each divider 22 has a hanger 26 attached to an upper portion thereof. As shown in FIGS. 2 and 3, the preferred embodiment of the hanger 26 has a lower leg which is attached to the sheet which forms the body of the divider 22 by means of rivets 28. These rivets 28 are flush with the back of the divider 22 and may conveniently be positioned to extend through preexisting perforations 24. FIG. 3A shows a modified form 26′ of the hanger 26 shown in FIGS. 2 and 3. Instead of being riveted, the hangers may be formed integrally with the perforated sheet by stamping the sheet material.

The hanger 26 has an upper leg 30 which is offset horizontally outwardly from the perforated sheet to form a space between the leg 30 and the perforated sheet to permit a coiled wire segment 100 to be hung on the hanger 26. The leg 30 terminates in an angled upper end to facilitate placement of a wire segment 100 on the hanger 26. The horizontal spacing of the dividers 22 in the carrier 2 allows the segments 100 to hang on the hangers 26 and extend downwardly and laterally outwardly therefrom, and the ends 102 of the segments 100 to be pulled outwardly for processing, as shown in FIGS. 8A and 8B, without binding caused by contact with an adjacent divider 22.

The carrier 2 includes two clamp devices 32 mounted on the upper flange 14 adjacent to the opposite lateral edges of the upper opening 8. Each of the devices 32 forms a plurality of releasable clamps positioned to receive one end 102 of each wire segment 100 hanging on the hangers 26 of dividers 22 positioned in the carrier body 4. The clamping of the ends 102 of the wire segments 100 positions the ends 102 for location and grasping by an operator, either human or robotic. It also maintains the loosely coiled configuration of the segments 100. The preferred embodiment of the clamp device 32 includes a clamp strip 33, a back-up strip 40, and a gauge strip 42. These strips 33, 40, 42 may be made from various materials, such as silicone rubber. They are secured to the top surface of the flange 14 by suitable means, such as an adhesive and/or fasteners (not shown).

Figure 6A:
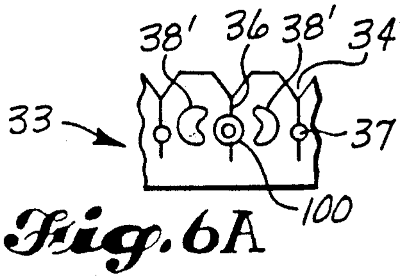
FIG. 6A is a fragmentary elevational view of the device shown in FIG. 6 with a wire segment clamped therein.
Figure 6:
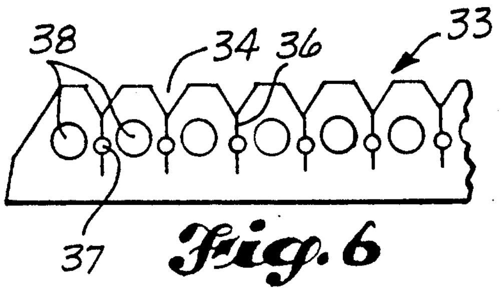
FIG. 6 is an elevational view of a portion of one of the clamping devices.

The details of the currently preferred structure of the clamp strip 33 are best seen in FIGS. 6 and 10. The resilient strip 33 is generally rectangular and has a plurality of V-shaped grooves 34 formed on its upper surface. A slit 36 extends laterally through the material of the strip 33 downwardly from the bottom of each groove 34. A round hole 37 extends laterally through the strip 33 at a midportion of each slit 36. Additional larger lateral holes 38 extend through the strip material between each pair of adjacent slits 36 and between each end slit 36 and each end of the strip 33 The holes 37 provide a space to centrally locate and accommodate a wire segment 100 and to allow the slits 36 to close after the segment 100 has been inserted. The closing of the slit 36 securely clamps the segment 100 in the strip 33.

The position of the clamped segment 100 is illustrated in FIG. 10. When a segment end 102 is inserted into the clamping strip 33, it is placed in the appropriate groove 34 and pushed down through the slit 36 into the hole 37. The movement of the segment end 102 through the slit 36 tends to displace and/or compress the adjacent portions of the clamp strip 33. The function of the holes 38 is to allow compression of the strip 33 so that the effect of inserting a wire segment 100 will be localized to the portion of the strip 33 immediately surrounding the location at which the segment 100 is being inserted. This localization is effective during the insertion of a segment 100, and in the case of a larger diameter segment 100, after the segment 100 has been clamped in the strip 33. FIG. 6A illustrates the deformed configuration 38, of two holes 38 caused by a relatively large diameter segment 100. The deformability of the holes 38 allows the clamp strip 33 to accommodate a wide range of wire diameters and prevents adjacent segments from interfering with the strip's clamping action.

The arrangement of the three strips 33, 40, 42 of the clamp device 32 is illustrated in FIGS. 1, 4, 7, 8A, and 8B. The back-up strip 40 is positioned along the inner portion of the flange 14 immediately adjacent to the upper opening 8. The back-up strip 40 increases the strength and stability of the clamp strip 33, which is mounted on the flange 14 in an abutting parallel relation to the back-up strip 40. The parallel gauge strip 42 abuts the opposite side of the clamp strip 33 and extends horizontally outwardly essentially to the outer edge of the flange 14. The height of the back-up and gauge strips 40, 42 is significantly less than the height of the clamp strip 33 to permit insertion and removal of the ends 102 of the wire segments 100 in the clamp strip 33. The gauge strip 42 guides the placement of the very end of the segment 100 to be substantially flush with the outer edge of the flange 14.

The clamp device 32 shown in the drawings and described above has the advantages of simplicity of structure, economy of manufacture, durability, and ease of use. It is currently preferred. However, the clamp device of the invention can be varied considerably. For example, the clamps may be provided in the form of plastic or metal opposing spring clips.

The preferred embodiment of the carrier 2 has robot engaging portions carried by the upper flange 1 of the body 4. These portions are indexed relative to the clamp devices 32 to enable a robot to accurately locate each end 102 of each segment 100 loaded in the carrier 2. As shown in FIGS. 1, 4, and 7, the robot engaging portions preferably comprise two locator members 44 secured to the flange 14 by suitable means, such as adhesive and/or fasteners (not shown). The locator members 44 are positioned on opposite corners of the flange 14. Each member 44 has a hole 46 opening onto its upper surface for receiving a portion of a robot. The members 44 are made from a rigid material, such as metal, to enable accurate indexing and to substantially reduce wear in the holes 46.

FIG. 8A illustrates a robot engaging one of the members 44 to determine the precise location of the carrier 2 and each of the wire segment ends 102. The portion of the robot 112 which engages the locator member 44 includes a solenoid that projects a tapered pin into the hole 46 in the member 44. The tapering of the two pins which engage the two locator members 44 and the force of the solenoid projecting the pins automatically correct for minor misalignment of the carrier 2. This type of solenoid and projecting pin arrangement is known in the art for use in locating objects by a robot.

FIG. 4 illustrates the manner in which the locating members 44 and clamp devices 32 are indexed relative to each other. During the assembly of the carrier 2, a locating template 16, made from a material such as sheet metal, is placed over the flange 14. The opposite lateral portions of the template 16 have lateral openings 18 extending therethrough. One end of the template 16 has two smaller openings 20 extending laterally along opposite corners thereof. The openings 18, 20 are dimensioned to closely receive the clamp devices 32 and locator members 44, respectively. With the template 16 placed on the flange 14, the devices 32 and members 44 are positioned to extend through the openings 18, 20 and to come into contact with the upper surface of the flange 14 adjacent to the openings 18, 20. With the template 16 in place, the devices 32 and members 44 are secured to the flange 14. This precisely positions the devices 32 relative to the members 44. After the devices 32 and members 44 have been secured, the template 16 is removed and may be used in the assembly of another carrier 2. The provision of separate locator members 44 and clamp devices 32 that are precisely located and secured on the carrier body 4 significantly reduces the cost of manufacturing the carrier 2 by avoiding any need to precisely dimension the carrier body 4.

FIG. 7 illustrates the manual loading of the carrier 2. Each of the dividers 22 is independently freely slidable along the slots 12 in which its opposite lateral edges are received. When the divider 22 is in its lower use or transport position, the hanger 26 and the top edge of the divider 22 are below the upper opening 8 of the carrier body 4, as shown in FIGS. 7, 8B, and 10. This positioning helps to ensure that the loaded segments 100 are not disturbed during transport of the carrier 2 and facilitates handling of the ends 102 of a segment 100 loaded in the carrier 2. FIG. 7 illustrates a divider 22, on which a coiled segment 100 of wire has been loaded by hanging the coil 100 on the hanger 26, being lowered from a raised loading position into its use position. In the loading position, the hanger 26 is above the upper opening 8 of the carrier body 4 to facilitate manual positioning of the coiled wire segment 100 thereon. In addition, the divider 22 is preferably tilted in its carrier slots 12 so that it will remain in its raised position without being held. This frees both hands of the operator for the loading procedure. When the divider 22 is lowered into its use position, the ends 102 of the segment 100 extend out over the clamp strips 33. Each end 102 is clamped to the corresponding strip 33 by the operator simply by exerting a downward force at two points of the segment end 102 on opposite sides of the strip 33. The clamp strips 33 hold the ends 102 securely in place during transport of the carrier 2 and position the ends 102 for ready access by an operator at a destination work station.

FIG. 7 also illustrates an optional feature of the carrier 2 which may be preferred in some applications. This feature is a memory module 48 mounted in a suitable cavity opening onto an outer end wall surface of the carrier body 4. The module 48 may be loaded with data identifying the wire segment 100 at each of the locations in the carrier 2 either before or after the carrier 2 is loaded. The data loaded into the module 48 may include the processing requirements for each segment 100. If the data is loaded before the carrier 2 is loaded, the operator loading the carrier 2 may use the data as a guide to the loading operation. If the data is loaded into the module subsequent to the loading of the wire segments 100 in the carrier 2, the identifying data may be used by subsequent operators as a guide to the processing of the wire segments 100. In embodiments without the memory module 48, the carrier 2 may be identified at each work station by its bar code 50 and/or its identification number 52. Then, the information required to process and/or handle the wire segments 100 can be obtained from a central source, such as a computer storage file, either automatically or at the instance of a human operator FIGS. 8A and 8B illustrate the handling of one end 102 of a wire segment 100 loaded in a carrier 2. The end 102 to be processed is gripped by a gripping device 110 on the end of a robotic arm. The gripping device 110 straddles the carrier clamp strip 33 and grips the wire end 102 on opposite sides of the strip 33. The robot then simply pulls the wire end 102 out of the strip 33. Then, since the wire segment 100 is in a loose coil hung on the hanger 26 of the divider 22, the robot is able to pull the end 102 away from the carrier 2 and into engagement with a suitable funnel opening 122 in a nearby wire end processing device 120. The processing device 120 may be, for example, a wire insulation stripper or a mechanism for crimping a wire terminal onto the wire end 102. FIGS. 8A and 8B illustrate the end 102 of the segment 100 opposite the end 102 being processed as already having a wire terminal 106 crimped thereon.

When the robot gripper 110 is moved to pull the wire end 102 away from the carrier 2, one or more loops of the coil formed by the wire segment 100 are reduced in diameter by the shortening of the portion of the segment 100 inside the carrier 2. FIGS. 8A and 8B illustrate the coil loop 104 from which the end 102 being manipulated extends as having a significantly reduced diameter. Since the wire forming the segment 100 tends to seek a straight configuration, the pulling of the end 102 to reduce the size of the coil loop 104 stores energy tending to pull the end 102 back toward its clamped position. Thus, when the end 102 has been processed, the robot does not need to exert any force to return the coil to its stowed configuration. The spring energy stored in the reduced diameter loop 104 pulls the end 102 back. The robot simply guides the movement of the end 102 and prevents it from moving too far into the carrier 2 beyond its clamping position. When the segment end 102 has moved back to its clamping position, the robot gripper 110 simply moves downwardly to reinsert the end 102 in the appropriate portion of the clamp strip 33. The replacement of a segment end 102 into its clamped transport position is similarly facilitated when the handler is a human, rather than a robot. In both oases, the construction of the carrier of the invention, and especially the divider 22, allows the segment end 102 to be reclamped quickly and without difficulty while avoiding any need for changing the position of the divider 22 or removing the entire segment 100 from the carrier 2 in order to process an end 102.

FIGS. 9 and 10 illustrate an optional feature of the carrier of the invention that is particularly advantageous in systems in which some or all of the segments ends 102 are to be processed manually. The illustrated feature is an indicator bar 58 which is temporarily mounted on the carrier body 4' adjacent to one of the clamp devices 32 while manual procedures are being performed. The carrier 2' shown in FIGS. 9 and 10 has been modified to accommodate the indicator bar 58. Corner end portions of the flange 14' are missing to allow the ends of the bar 58 to abut the end walls of the carrier 2'. Each end of the bar 58 has a spring loaded latch pin 60 which releasably engages a corner end portion of the end wall of the carrier body 4'. FIGS. 9 and 10 show a single bar 58. The carrier 2 may also be provided with two such bars 58, one on each side.

The bar 58 has a plurality of lights 62 spaced along its upper surface between its two ends. These lights 62 are preferably light emitting diodes and are positioned to be aligned with the V-shaped grooves 34 on the clamp strip 33 to align them with the wire segment ends 102 clamped in the strip 33. A connector cord 64 extends from the bar 58 to enable it to be plugged into a source of power and command signals to cause the appropriate light 62 to be lit. The internal circuitry 66 of the indicator bar 58 has a known design and is shown in block form in FIG. 10. The circuitry preferably includes a digital multiplexer 68, as indicated in FIG. 9. Although a human operator may locate a particular segment end 102 without a device such as the indicator bar 58, the bar 58 significantly reduces the time consumed in locating segment ends 102 and helps to reduce human error.

The method of the invention relates to batch handling and processing of a plurality of wire segments 100. In the method of the invention, the segments 100 are hung in loosely coiled configurations on the hangers 26 of the dividers 22 in the carrier 2. Each segment 100 is hung on a different hanger 26. In the currently preferred embodiment of the method, the carrier 2 is loaded by hanging the segments 100 on the hangers 26 manually, as illustrated in FIG. 7 and described above.

Each of the clamp devices 32 provides a row of clamps each of which is formed by portions of the clamp strip 33 adjacent to a slit 36 in the strip 33. Each end. 102 of each wire segment 100 is secured in one of these clamps in the manner described above. In a fully loaded carrier 2, there is one loosely coiled segment 100 hanging on each hanger 26, and each clamp secures one end 102 of one of the segments 100 loaded in the carrier 2. As can be seen in FIGS. 7, 8A, and 8B, the ends 102 naturally extend laterally outwardly, generally tangentially from the loose coil of the segment 100. This positions the two opposite ends 102 of each segment 100 adjacent to the opposite clamp devices 32, respectively.

When the carrier 2 has been loaded, fully or partially as circumstances require, the carrier 2 is transported to a work station where one or more wire end processing devices 120 are located. The transportation of the carrier 2 may be accomplished by automatic means, such as conveyor belts, or manually by an operator picking the carrier 2 up by means of the carrying slots 54. At the work station, one or more segment ends 102 is released from the clamp strip 33, pulled into engagement with the processing device 120, and then moved back to the clamp strip 33 and resecured therein, as described above in connection with FIGS. 8A and 8B. This handling of the segment end 102 may be accomplished by a robot or a human operator. In either case, the main portion of the segment 100 remains hanging on the hanger 26 in a coiled configuration throughout the releasing, pulling, moving, and resecuring of the end 102. This allows the processing of the segment end 102 to be carried out easily and quickly. Additional segment ends 102 may be processed at the same work station and/or at additional work stations to which the loaded carrier 2 is transported in the same manner it is transported to the first work station.

Preferably, the segments 100 are marked and cut prior to being loaded in the carrier 2 in accordance with the present invention. For example, the segments 100 may be marked and cut using the type of preparation subsystem disclosed in U.S. Pat. No. 4,677,734, granted Jul. 7, 1987, to Joseph T. Bloch and the present applicant. In such case, each segment 100 is preferably fed out of the marking and cutting mechanism into a coiling bowl of a standard type. The diameter of the bowl is chosen to correspond to the coil diameter suitable to the dimensioning of the carrier 2. Each coiled cut segment 100 is manually removed from the bowl and then installed in the carrier 2 by hanging it on a hanger 26.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A method of transporting a plurality of wire segments and of delivering the ends of said segments to devices for processing said ends, comprising:

providing a carrier having a top opening; said carrier including a plurality of substantially vertical, horizontally spaced dividers, and two rows of clamps adjacent to opposite lateral edges of said opening; each said divider having a hanger on a top portion thereof;

hanging each of a plurality of wire segments in a loosely coiled configuration on a different one of said hangers, and allowing said segment to extend downwardly and laterally outwardly from said hanger in said carrier;

securing each end of each said segment in a clamp in a different one of said rows of clamps;

transporting the carrier with said segments hanging therein and said ends so clamped to a work station where at least one said device is located;

releasing one end of one of said segments from said clamp, and while allowing said segment to continue to hang on said hanger, pulling said one end into engagement with said device; and after pulling said one end and while continuing to allow said segment to hang on said hanger, moving said one end back to said clamp and again securing said one end in said clamp.

2. The method of claim 1, which comprises providing said carrier with robot engaging portions, and indexing said clamps to said portions to enable a robot to precisely locate each end of each wire segment secured by said clamps; and in which the steps of releasing, pulling, moving, and again securing said one end include causing a robot to grip said one end.

3. The method of claim 2, in which the step of pulling said one end includes storing spring energy in said segment by reducing the diameter of a coil of said segment, and the step of moving said one end back includes allowing said spring energy to pull said one end.

4. The method of claim 1, in which the step of pulling said one end includes storing spring energy in said segment by reducing the diameter of a coil of said segment, and the step of moving said one end back includes allowing said spring energy to pull said one end.

5. The method of claim 1, comprising, before hanging each said segment, sliding said divider upwardly into a loading position in which said hanger is above said opening; and after hanging said segment, lowering said divider into a transport position in which said hanger is at least substantially below said opening.

* * * * *